US008651905B2

(12) United States Patent
Zottele et al.

(10) Patent No.: US 8,651,905 B2
(45) Date of Patent: Feb. 18, 2014

(54) DEVICE FOR DETECTING THE ANGULAR POSITION OF A STEERING SHAFT

(75) Inventors: Michele Zottele, Trento (IT); Andrea Pellegrinetti, Trento (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 208 days.

(21) Appl. No.: 13/120,993

(22) PCT Filed: Sep. 29, 2009

(86) PCT No.: PCT/EP2009/062614
§ 371 (c)(1),
(2), (4) Date: Mar. 25, 2011

(87) PCT Pub. No.: WO2010/037744
PCT Pub. Date: Apr. 8, 2010

(65) Prior Publication Data
US 2011/0177731 A1    Jul. 21, 2011

(30) Foreign Application Priority Data
Oct. 2, 2008    (DE) .......................... 10 2008 042 596

(51) Int. Cl.
*B63H 5/20* (2006.01)
*B63H 5/125* (2006.01)
*B63H 20/08* (2006.01)
*B63H 25/10* (2006.01)

(52) U.S. Cl.
USPC ........................................ 440/53; 114/144 R

(58) Field of Classification Search
USPC ............. 440/49, 53, 57, 76, 78, 83, 111, 112; 114/144 R, 154–158
See application file for complete search history.

(56) References Cited

U.S. PATENT DOCUMENTS

| 2,941,495 | A | * | 6/1960 | Goldman ........................ 440/58 |
| 3,372,668 | A | | 3/1968 | Chambers |
| 5,492,029 | A | | 2/1996 | Obrist |
| 6,552,533 | B2 | | 4/2003 | Schodlbauer et al. |
| 7,765,702 | B2 | | 8/2010 | Schirp et al. |
| 2004/0029460 | A1 | | 2/2004 | Hartig et al. |
| 2004/0038602 | A1 | | 2/2004 | Tanaka et al. |
| 2008/0149815 | A1 | | 6/2008 | Vukovic |

FOREIGN PATENT DOCUMENTS

| DE | 120 359 | 6/1900 |
| DE | 576 910 | 5/1933 |
| DE | 199 62 241 A1 | 7/2001 |
| DE | 100 62 354 A1 | 7/2002 |
| DE | 10 2004 021 405 A1 | 7/2005 |
| DE | 10 2006 023 286 A1 | 11/2007 |
| EP | 0 641 621 A1 | 3/1995 |

* cited by examiner

*Primary Examiner* — Daniel V Venne
(74) *Attorney, Agent, or Firm* — Davis & Bujold, PLLC; Michael J. Bujold

(57) ABSTRACT

A device for detecting an angular position of a steering shaft (8), in particular for a steering unit of a boat drive (4, 5), using an angular sensor (13). The steering shaft (8) and the angular sensor (13) are kinematically interconnected, via a play-reducing intermediate gear (11, 16), which engages with a master gear (10) of the steering shaft (8) and a slave gear (12) of the angular sensor (13) to facilitate precise detection of angular rotation of the steering shaft (8).

10 Claims, 5 Drawing Sheets

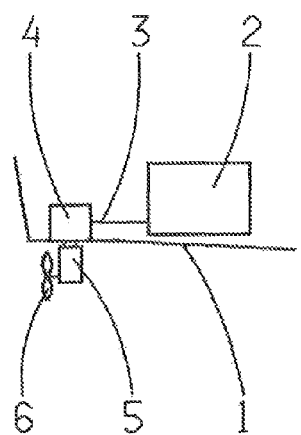
(PRIOR ART) Fig. 1
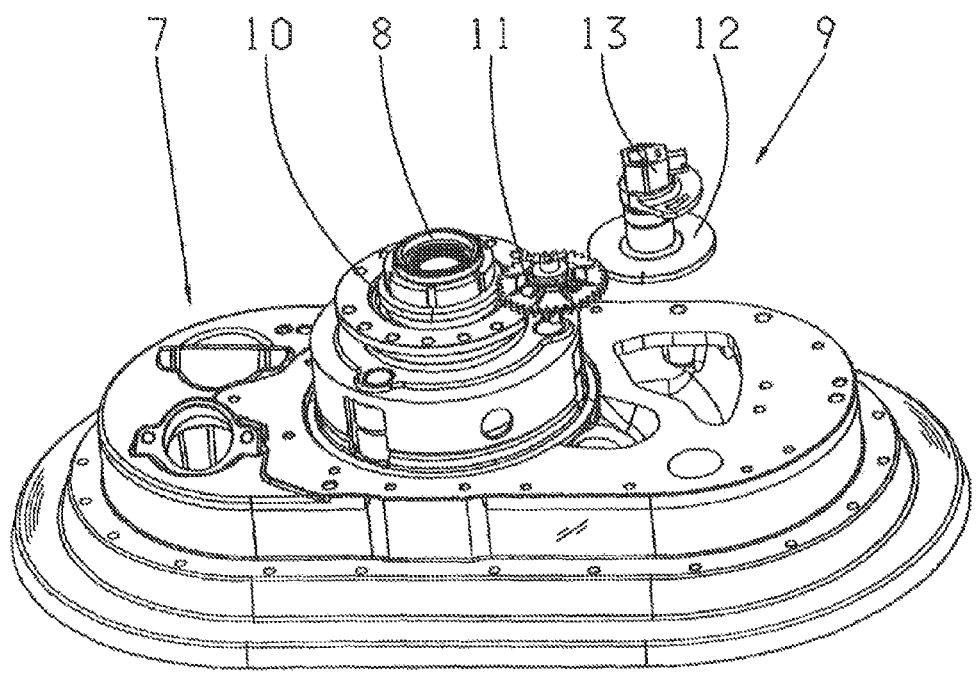
Fig. 2

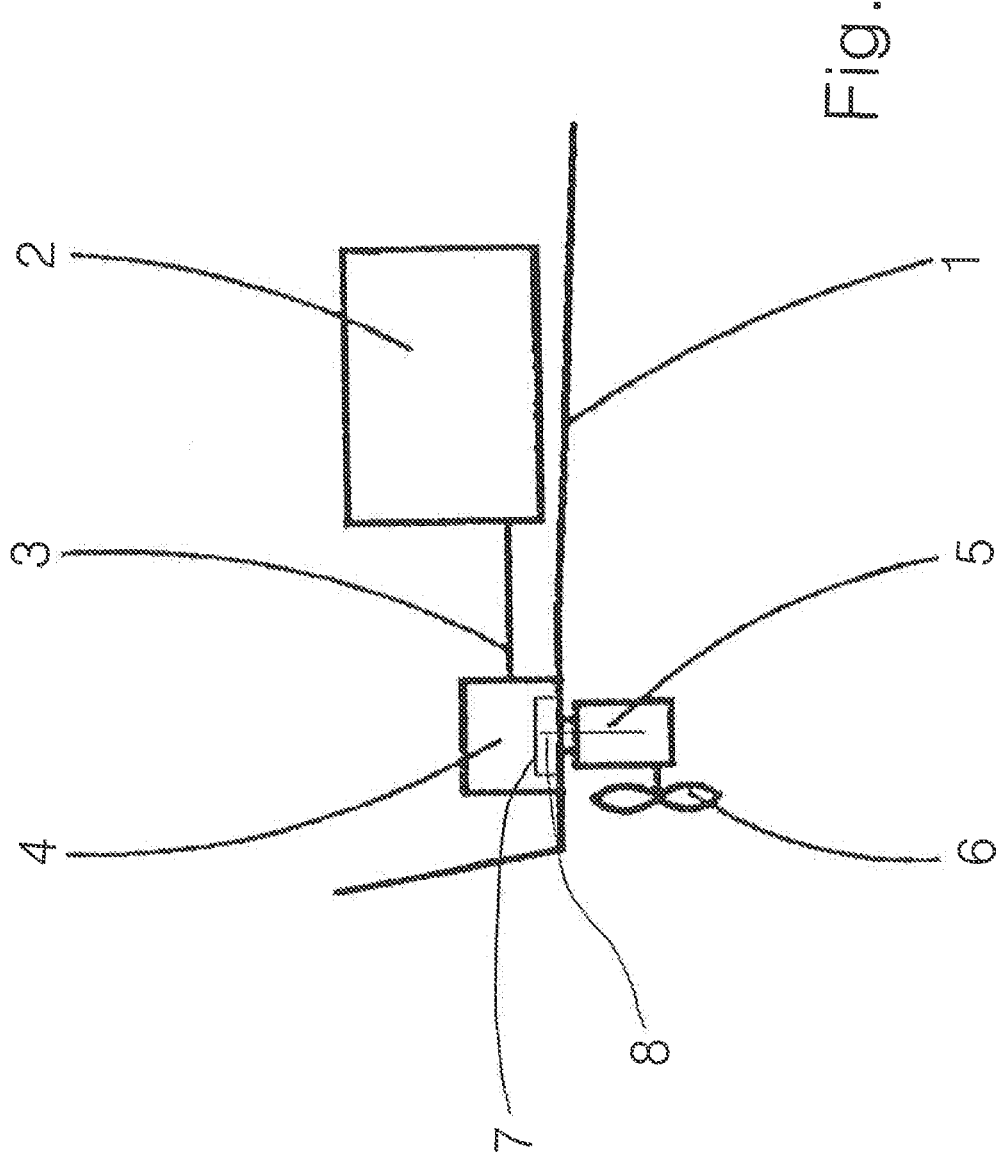

DEVICE FOR DETECTING THE ANGULAR POSITION OF A STEERING SHAFT

This application is a National Stage completion of PCT/EP2009/062614 filed Sep. 29, 2009, which claims priority from German patent application serial no. 10 2008 042 596.6 filed Oct. 2, 2008.

FIELD OF THE INVENTION

The invention relates to a device for detecting an angular position.

BACKGROUND OF THE INVENTION

Known inboard boat drives comprise an underwater propulsion and steering unit which is equipped with one or two propellers and can be swivelled about a vertical axis. The swivellability of the propulsion vector created by the propellers enables a steering effect for the boat to be attained. The swivelling is carried out using a steering shaft which is controlled by a steering unit. The particular steering angle (the angle of the propulsion vector relative to the midship axis) is measured using an angular sensor, wherein the swivel motion of the steering shaft is transferred via gears to the angular sensor. The disadvantage of the known measurement devices is that the rotational motion is transferred with play, and therefore the angle that is displayed is inaccurate.

SUMMARY OF THE INVENTION

The problem addressed by the present invention is that of ensuring that transfer occurs with minimal play and an accurate display of angle for a device of the initially described type.

According to the invention, the steering shaft and the angular sensor are kinematically interconnected by a play-reducing intermediate gear, wherein the intermediate gear is engaged with a master gear of the steering shaft, and with a slave gear of the angular sensor. In an advantageous embodiment, the master gear, the slave gear, and the intermediate gear are in the form of gear wheels in tooth engagement with one another.

According to an advantageous embodiment, the intermediate gear is split and comprises two disks (wheel disks) which can be displaced relative to one another in the circumferential direction, and which are elastically loaded in the circumferential direction, preferably by compression springs acting in the circumferential direction. The two disks are disposed coaxially to one another and are interconnected by a mating connection. The intermediate gear results in the advantage that play in the circumferential direction, i.e., the play between the engaged teeth, is reduced or eliminated since a right flank and a left flank of the intermediate gear rest against both flanks of a tooth space in the master gear or the slave gear. This elimination of circumferential play results in an exact display of the angle of the steering shaft.

According to a further preferred embodiment, the intermediate gear is split into two and comprises two outer wheel disks and one center gear, wherein each outer disk is elastically loaded against the center gear in the circumferential direction. Therefore, each of the outer wheel disks can be displaced toward the center gear in the circumferential direction. The tooth engagement with the master gear takes place via the first outer wheel disk and the center gear, and the tooth engagement with the slave gear takes place via the second outer wheel disk and the center gear. The result is the advantage of compensation of all play, i.e., for the master gear and the slave gear, for the case in which the tooth spaces of the master gear and the slave gear have tolerance-related deviations in the circumferential direction, e.g., pitch errors.

According to a preferred embodiment, the wheel disks are loaded by tangentially disposed compression springs, each of which is supported against a wheel disk, or against a wheel disk and the center gear. The compression springs are easily installed by being placed into pockets formed in the circumferential direction.

BRIEF DESCRIPTION OF THE DRAWINGS

Example embodiments of the invention are shown in the drawings and are described in greater detail in the following, wherein further features and/or advantages will become apparent from the drawings and/or the description. In the drawings FIG. 1 shows a boat drive according to the prior art, FIG. 2 shows a boat drive comprising steering shaft and angular position detection device according to the invention, FIG. 8 a diagrammatic drawing showing the boat drive.

DETAILED DESCRIPTION OF THE PREFERRED EMBODIMENTS

Figure 3:
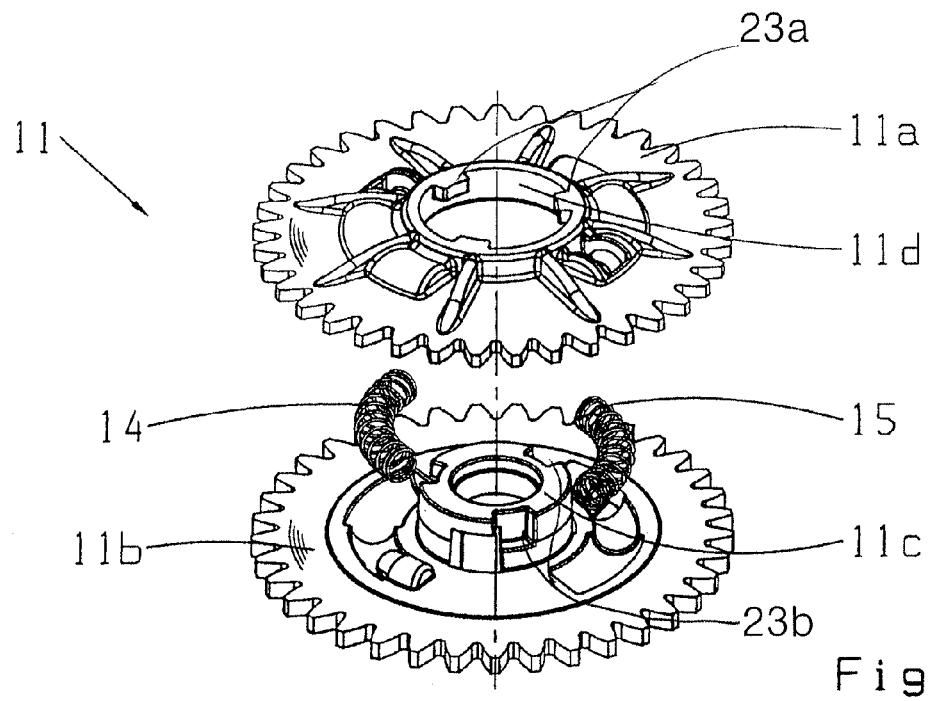
FIG. 3 shows a play-reducing intermediate gear in an exploded view.

FIG. 1 shows a schematic representation of a drive system for a hull 1 according to the prior art. A drive machine 2, e.g., a diesel engine, which is connected to a transmission 4, via a drive shaft 3, is disposed inside the hull 1. A propulsion and steering unit 5 comprising a propeller 6 is disposed outside of the hull 1, i.e., underwater, such that it can swivel about a vertical axis which is not shown. The rotational motion of the drive shaft 3 is, therefore, transferred via a bevel gear (bevel gear stage) in the transmission 4 and a bevel gear in the propulsion and steering unit 5 to the propeller 6. The steering effect for the boat is, therefore, attained by swivelling the propulsion vector created by the propeller 6.

FIG. 2 shows a section of a transmission assembly 7 which is part of a not-shown boat drive which basically corresponds to the boat drive according to FIG. 1. A steering shaft 8, disposed inside the transmission assembly 7, is used to swivel an underwater propulsion and steering unit (see reference numeral 5 in FIG. 1) to attain a steering effect on the boat. The angle by which the steering shaft is swivelled relative to the midship direction, for example, and which is referred to in the following as the steering angle, is detected using an angular position measuring device 9 which comprises the following components: a master gear 10 fastened to the steering shaft 8, a play-reducing intermediate gear 11, and a slave gear 12 which is fastened on a commercially available angular sensor 13. The master gear 10, the intermediate gear 11, and the slave gear 12 are in the form of gear wheels and have tooth engagement with one another, and therefore the swivel motion of the steering shaft 8 is transferred to the slave gear 12 with the same direction of rotation.

FIG. 3 shows the play-reducing intermediate gear 11 in an enlarged exploded view. As shown in the illustration, the intermediate gear 11 is split and comprises a first, upper wheel disk 11a and a second, lower wheel disk 11b comprising a hub 11c. Two helical compression springs arranged in the circumferential direction, which are referred to as compression springs 14, 15, are disposed between the wheel disks, which are also referred to below as disks 11a, 11b. The upper disk 11a comprises a hub ring 11d which can be inserted onto the hub 11c of the lower disk 11b in the manner of a mating connection 23a, 23b, and is therefore centered.

Figure 4:
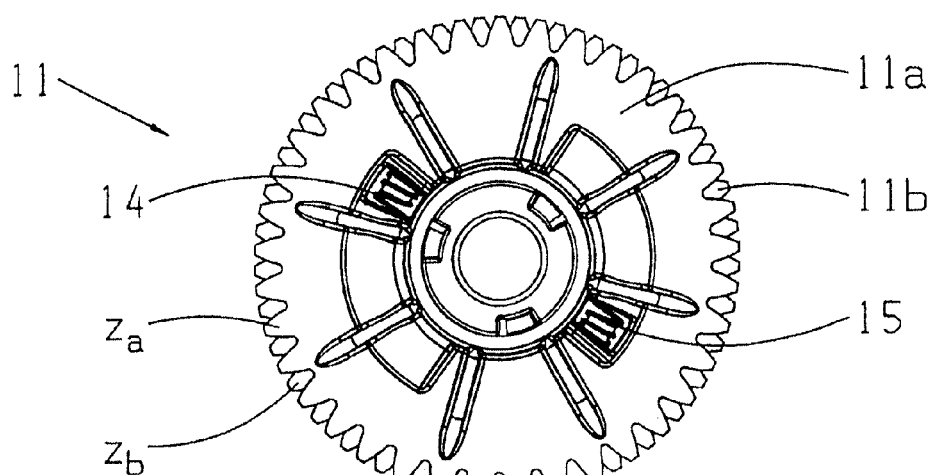
FIG. 4 shows the intermediate gear in a top view.

FIG. 4 shows the two disks 11a, 11b with the compression springs 14, 15 in the installed state, in a top view. The two disks 11a, 11b have the same gearing, wherein the teeth $z_a$ of the upper disk 11a are offset, in the circumferential direction, relative to the teeth $z_b$ of the lower disk 11b due to the action of the compression springs 14, 15, i.e., they are located over spaces.

Figure 5:
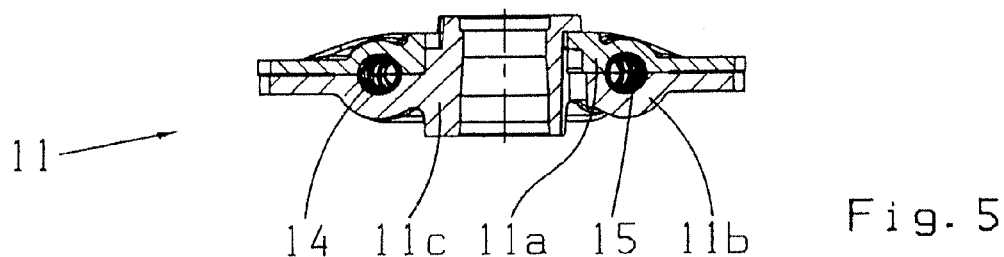
FIG. 5 shows the intermediate gear in a cross-sectional view.

FIG. 5 shows the intermediate gear 11, in a cross-sectional view, wherein the accommodation of the compression springs 14, 15, in toroidal recesses or pockets of the two disks 11a, 11b, is visible.

Figure 6:
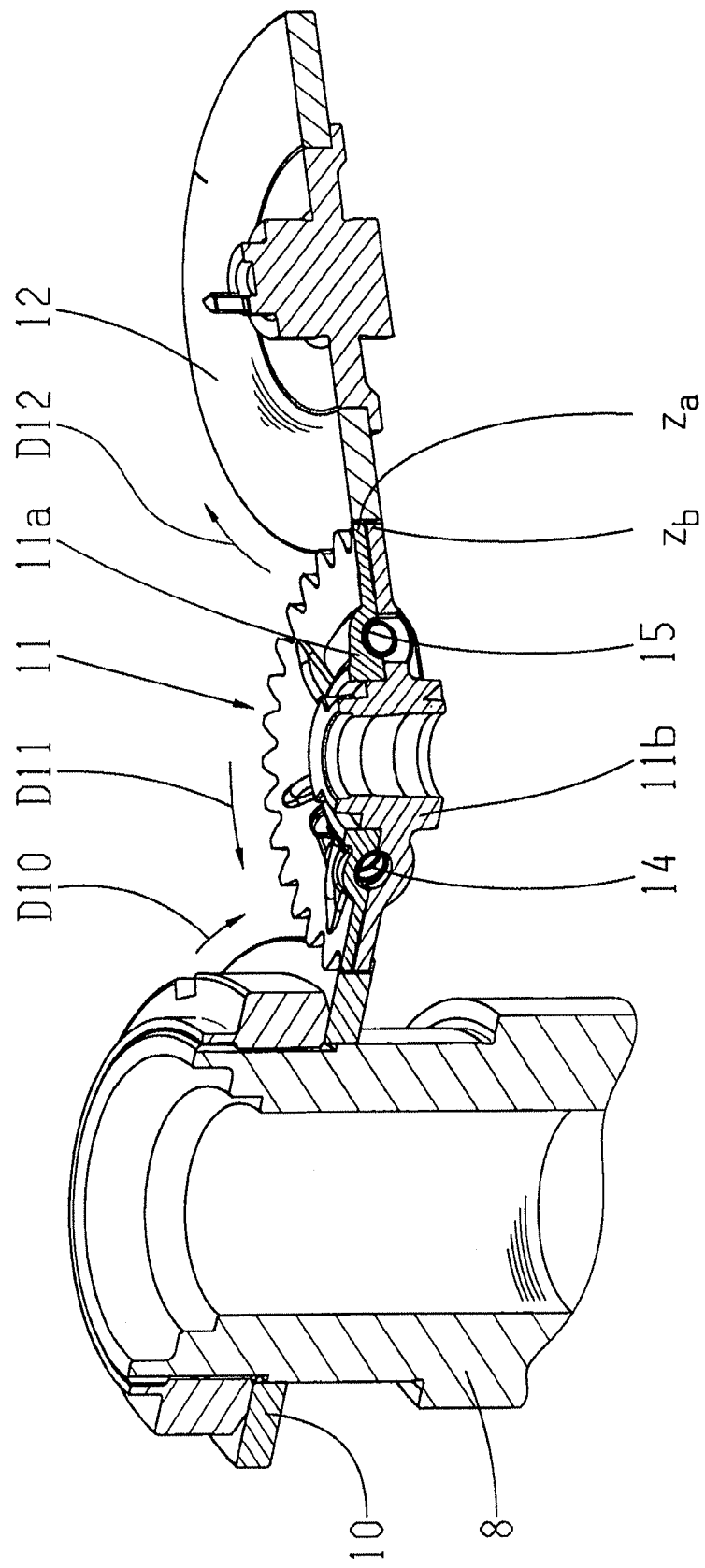
FIG. 6 shows the angular position detection device, according to the invention, in an enlarged perspective cross-sectional view.

FIG. 6 shows, in an enlarged perspective cross-sectional view, the engagement of the intermediate gear 11 with the master gear 10 and the slave gear 12. The master gear 10 is non-rotatably mounted on the steering shaft 8. As shown, the teeth $z_a$ of the upper wheel disk 11a and the teeth $z_b$ of the lower wheel disk 11b are in tooth engagement with the master gear 10 and with the slave gear 12. The effect of the play-reducing intermediate gear 11 is to spread the engaged teeth $z_a$, $z_b$ within a tooth space of the master gear 10 and of the slave gear 12 in the circumferential direction, with the result that they rest against both tooth flanks of the particular tooth space. As an example, the direction of rotation of the control shaft 8 is indicated by an arrow D10, the direction of rotation of the intermediate gear 11 is indicated by an arrow D11, and the direction of rotation of the slave gear 12 is indicated by an arrow D12. In this case, a right tooth flank of the driving slave gear 10 rests against a right tooth flank of the upper wheel disk 11a. The direction of rotation, initiated by the upper disk 11a, is transferred to the slave disk 12 by the lower disk 11b due to the spreading effect of springs 14, 15, wherein a left tooth flank of the tooth $z_b$ rests against a left tooth flank of the slave gear 12. The springs 14, 15 are sized such that they transfer the torque generated, which is relatively low, without play, that is, practically no spring compression takes place in the circumferential direction. Due to this effect of the intermediate gear 11, the rotational motion of the steering shaft 8 is transferred without play to the slave gear 12 of the angular sensor 13, thereby enabling exact detection of the steering angle that is present at the moment.

Figure 7:
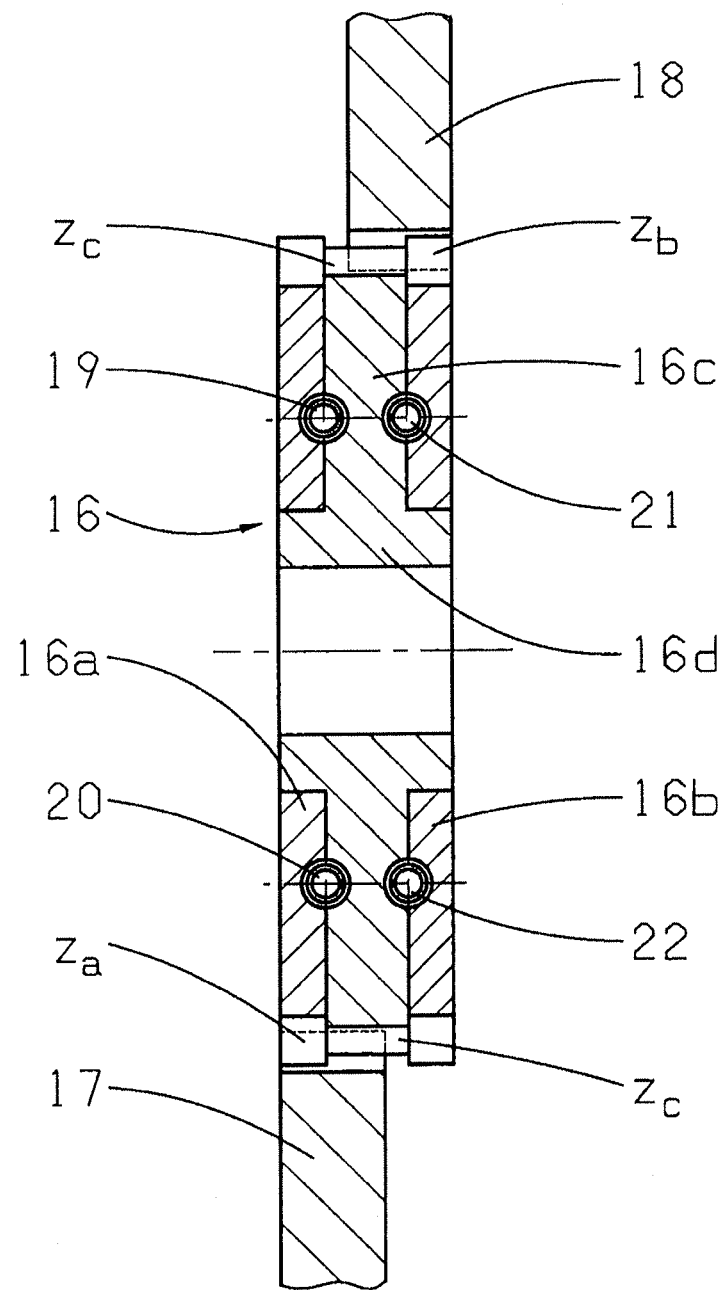
FIG. 7 shows a second example embodiment of the invention comprising a play-reducing intermediate gear split into two.

FIG. 7 shows a second example embodiment of the invention for a play-reducing intermediate gear 16 which has tooth engagement with a master gear 17 and a slave gear 18. The intermediate gear 16 is split into two, i.e., it comprises a first and a second outer wheel disk 16a, 16b and a center gear 16c having a hub 16d on which the two outer wheel disks 16a, 16b are centered. Compression springs 19, 20 are disposed in the circumferential direction between the first outer wheel disk 16a and the center gear 16c, and further compression springs 21, 22 are disposed between the second outer wheel disk 16b and the center gear 16c, and therefore the two outer wheel disks 16a, 16b are loaded in the circumferential direction relative to the center gear 16c. The illustration shows that only the gearing $z_a$ of the first outer wheel disk 16a and the gearing $z_c$ of the center gear 16c are engaged with the master gear 17, while the gearing $z_b$ of the second outer wheel disk 16b and the gearing $z_c$ of the center gear 16c are engaged with the slave gear 18. Play is compensated for entirely in the transfer of rotational motion from the master gear 17 to the slave gear 18 via the intermediate gear 16 which comprises three gear wheels 16a, 16b, 16c, which are disposed such that they can undergo angular movement relative to each other, and such that they are elastically loaded against each other. It should be assumed that—although identical gearings are provided—tolerance-related deviations, e.g., pitch errors in the production of the gearing, will occur, and therefore the pitch of a tooth space of the master gear 17 will not correspond exactly to a tooth space of the slave gear 18. In this case, it is possible for the two outer wheel disks 16a, 16b to spread in the circumferential direction independently of one another, thereby ensuring that circumferential play does not occur in a tooth space of the master wheel 17 nor in a tooth space of the slave wheel 18.

FIG. 8 diagrammatically shows a boat drive 24 which a steering device having a steering shaft 8 which swivels an underwater propulsion and steering unit 5 and propeller 6, by a desired steering angle, to achieve a steering effect on the boat 25.

REFERENCE CHARACTERS 1 hull
2 drive motor
3 drive shaft
4 transmission
5 propulsion and steering unit
6 propeller
7 transmission assembly
8 steering shaft
9 angular position measuring device
10 master gear
11 intermediate gear
11a first wheel disk
11b second wheel disk
11c hub
11d hub ring
12 slave gear
13 angular sensor
14 compression spring
15 compression spring
16 intermediate gear
16a first outer wheel disk
16b second outer wheel disk
16c center gear
16d hub
17 master gear
18 slave gear
19 compression spring
20 compression spring
21 compression spring
22 compression spring
D10 direction of rotation, gear 10
D11 direction of rotation, gear 11
D12 direction of rotation, gear 12
$z_a$ tooth, wheel disk 11a, 16a
$z_b$ tooth, wheel disk 11b, 16b
$z_c$ tooth, center gear 16c

The invention claimed is:
1. A device for detecting an angular position of a steering shaft (8) comprising:
a boat transmission assembly (7) comprising:

a steering shaft (8) which swivels an underwater propulsion and steering unit (5) by a steering angle to achieve a steering effect for the underwater propulsion and steering unit,
an angular sensor (13) for detecting the steering angle of the steering shaft (8), and
an intermediate gear (11),
the steering shaft (8) is connected to a master gear (10),
the angular sensor (13) comprises a slave gear (12),
the intermediate gear (11) is disposed between the master gear (10) and the slave gear (12),
the intermediate gear (11) directly engages both the master gear (10) and the slave gear (12),
the intermediate gear (11) is a split gear and comprises a first wheel disk (11a) and a coaxial disposed second wheel disk (11b), and the coaxially disposed first and second wheel disks (11a, 11b) are elastically loaded relative to one another, and
the first and the second wheel disks (11a, 11b) each have a same tooth gearing (za, zb).

2. The device according to claim 1, wherein the second wheel disk (11b) comprises a hub (11c) on which the first wheel disk (11a) is disposed on and is retained by a connection which limits relative rotation between the first wheel disk (11a) and the hub (11c).

3. A device for detecting an angular position of a steering shaft (8), the device comprising:
a boat transmission assembly (7) comprising:
the steering shaft (8) that supports a master gear (10),
an angular sensor (13) that supports a slave gear (12), and
a single intermediate gear (11, 16),
the steering shaft (8) and the angular sensor (13) are interconnected with one another via the intermediate gear (11, 16);
the intermediate gear (11, 16) reduces play of the master gear (10) and the slave gear (12) relative to the intermediate gear (11),
the master gear (10), the slave gear (12), and the intermediate gear (11) are each gear wheels,
the intermediate gear (16) comprises a center gear (16c) which supports first and second outer wheel disks (16a, 16b), and
each of the first and the second outer wheel disks (16a, 16b) is elastically loaded in a circumferential direction, relative to the center gear (16c).

4. The device according to claim 3, wherein the first and the second outer wheel disks (16a, 16b) and the center gear (16c) have a same tooth gearing (za, zb, zc), and the first outer wheel disk (16a) and the center gear (16c) are both in tooth engagement with the master gear (17), and the second outer wheel disk (16b) and the center gear (16c) are both in tooth engagement with the slave gear (18).

5. The device according to claim 4, wherein the center gear (16c) comprises a hub (16d) on which the first and the second outer wheel disks (16a, 16b) are coaxially disposed so as to limit relative movement between each of the first and the second outer wheel disks (16a, 16b) and the center gear (16c).

6. The device according to claim 3, wherein at least one tangentially disposed compression spring (14,15; 19, 20, 21, 22) elastically loads each of the first and the second outer wheel disks (16a, 16b) in the circumferential direction with respect to the center gear (16c).

7. A device for detecting angular position of a steering shaft, the device comprising:
a boat transmission assembly comprising:
a steering shaft (8);
a master gear (10) surrounding and rotationally fixed to the steering shaft (8);
an intermediate gear (11) directly engaging the master gear (10); and
an angular sensor (13) comprising a slave gear (12);
the slave gear (12) directly engaging the intermediate gear (11) and being spaced from the master gear (10) by the intermediate gear (11);
the intermediate gear (11) being split and comprising a first wheel disk (11a) and a coaxial dispose second wheel disk (11b); and
the first and the second wheel disks (11a, 11b);
(a) are rotatable relative to one another,
(b) are spring biased in opposite circumferential directions by at least one tangentially disposed compression spring (14,15; 19, 20, 21, 22), and
(c) each have a same gearing (za, zb).

8. The device according to claim 7, wherein
the intermediate gear (11) further comprises a center gear (16c);
the center gear (16c) directly engages both the master gear (10) and the slave gear (12);
the first and the second wheel disks (11a, 11b) comprise outer wheel disks (16a, 16b) arranged axially adjacent to and on opposite sides of the center gear (11);
the first wheel disk (16a) directly engages the master gear (18) and not the slave gear (12); and
the second wheel disk (16b) directly engages the slave gear (12) and not the master gear (18).

9. The device according to claim 7, wherein both the first and the second wheel disks directly engage both the master gear (10) and the slave gear (12).

10. The device according to claim 7, wherein the second wheel disk (11b) comprises a hub (11c) on which the first wheel disk (11a) is disposed, and the connection retains and limits relative rotation between the first wheel disk (11a) and the hub (11c).

* * * * *